United States Patent Office.

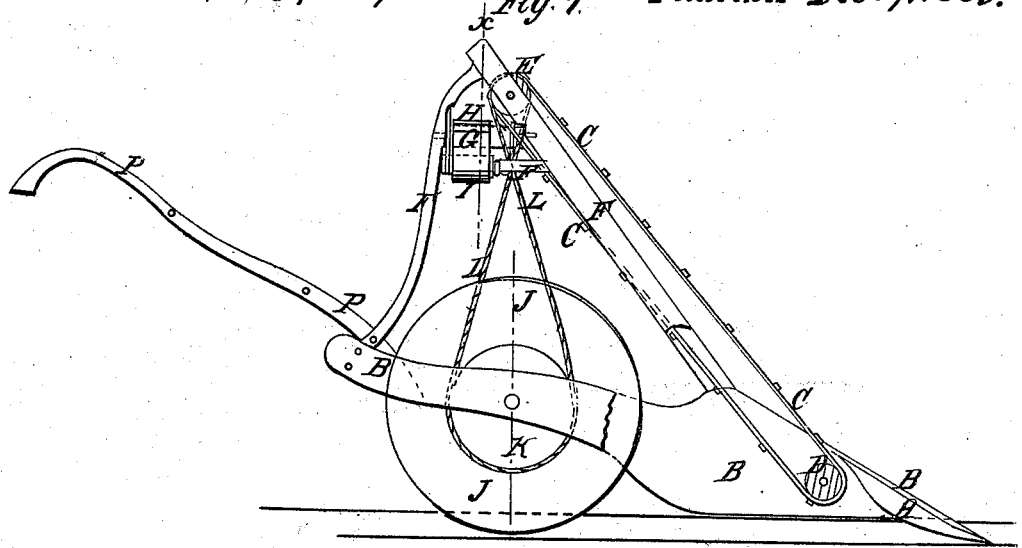
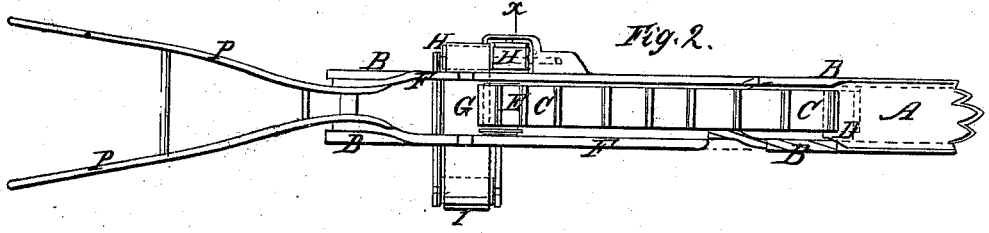
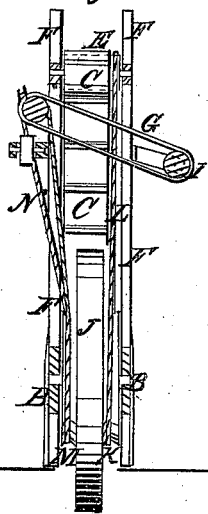

H. L. HALL, OF BUFFALO, NEW YORK.

Letters Patent No. 97,504, dated December 7, 1869.

IMPROVEMENT IN DITCHING-MACHINE.

The Schedule referred to in these Letters Patent and making part of the same.

To all whom it may concern:

Be it known that I, H. L. HALL, of Buffalo, in the county of Erie, and State of New York, have invented a new and improved Ditching-Machine; and I do hereby declare that the following is a full, clear, and exact description thereof, which will enable others skilled in the art to make and use the same, reference being had to the accompanying drawings, forming part of this specification, in which—

Figure 1 is a side view of my improved machine, partly in section, to show the construction.

Figure 2 is a top view of the same, part being broken away, to show the construction.

Figure 3 is a detail sectional view of the same, taken through the line $x$ $x$, fig. 1.

Figure 4 is a detail view of the cross or side spout.

Similar letters of reference indicate corresponding parts.

My invention has for its object to furnish a simple, convenient, and effective machine for opening ditches, and which shall be so constructed and arranged that it may be used for making crooked ditches; and It consists in the construction and combination of the various parts of the machine, as hereinafter more fully described.

A is the plow or digger, the forward part or point of which is made toothed, as shown in fig. 2.

The plow A is set in an inclined position, and to its side edges are attached the side bars of the frame B, the upper edges of the forward parts of which project a little above the plow A, to form guide-flanges, to conduct the dirt raised by the plow to the elevator-belt C.

The elevator C is formed by attaching a series of buckets to an endless belt, which passes around a roller, D, pivoted to and between the side bars or plates of the frame B, directly beneath the rear or upper end of the inclined plow A, so as to receive the dirt from said plow.

The upper part of the belt C passes around a roller, E, pivoted to and between the front side bars of the frame-work F, as shown figs. 1, 2, and 3.

G is an endless carrier-belt, placed a little below the rear or upper part of the elevator-belt C, in an inclined position, with its lower end extending out at the side of the machine, so as to convey the dirt received from the elevator C to a sufficient distance from the ditch to keep it from falling back into said ditch.

The carrier G passes around the rollers H and I, pivoted to supports formed upon or attached to the frame-work F.

The base-frame B, in the rear of the plow A, and of the lower part of the elevator C, is contracted or made narrower, as shown in fig. 2, to allow the machine to move more freely through the ditch, and to allow the machine to be turned in opening a crooked ditch.

J is the drive-wheel, which is pivoted to and between the side bars of the base-frame B, at or near its middle part, to bring the machine more fully under the control of the operator, when being operated.

To one side of the drive-wheel J is attached a pulley, K, around which, and around a pulley formed upon or attached to the roller E, passes a band, L, so that the elevator may be driven by the advance of the machine.

To the other side of the drive-wheel J is attached or upon it is formed another pulley, M, around which, and around a pulley formed upon or attached to the roller H, passes a band, N, so that the cross-carrier G may be driven by the advance of the machine.

When the dirt to be raised is dry, so that it will not stick or clog, I prefer to replace the carrier G H I by a spout, O, supported by the same rods or bolts that pivot the rollers H I; but when the dirt to be raised is wet or clayey, so that it would adhere to or clog the spout O, I prefer to use the carrier G H I, as hereinbefore described.

P are the handles, by means of which the machine is guided, and which are attached to the rear part of the base-frame B, as shown in figs. 1 and 2.

Having thus described my invention,

What I claim as new, and desire to secure by Letters Patent, is—

1. The combination of the toothed plow A, frames B and F, elevator C, rollers D and E, band L, and drive-wheel J, and the transverse carrier G, with each other, substantially as herein shown and described, and for the purpose set forth.

2. Contracting the base-frame B, in the rear of the plow A, and lower end of the elevator C, substantially as herein shown and described, and for the purpose set forth.

The above specification of my invention signed by me, this 20th day of April, 1869.

H. L. HALL.

Witnesses:
GEO. JOHNSON,
R. V. PIERCE.